United States Patent Office 2,979,736
Patented Apr. 18, 1961

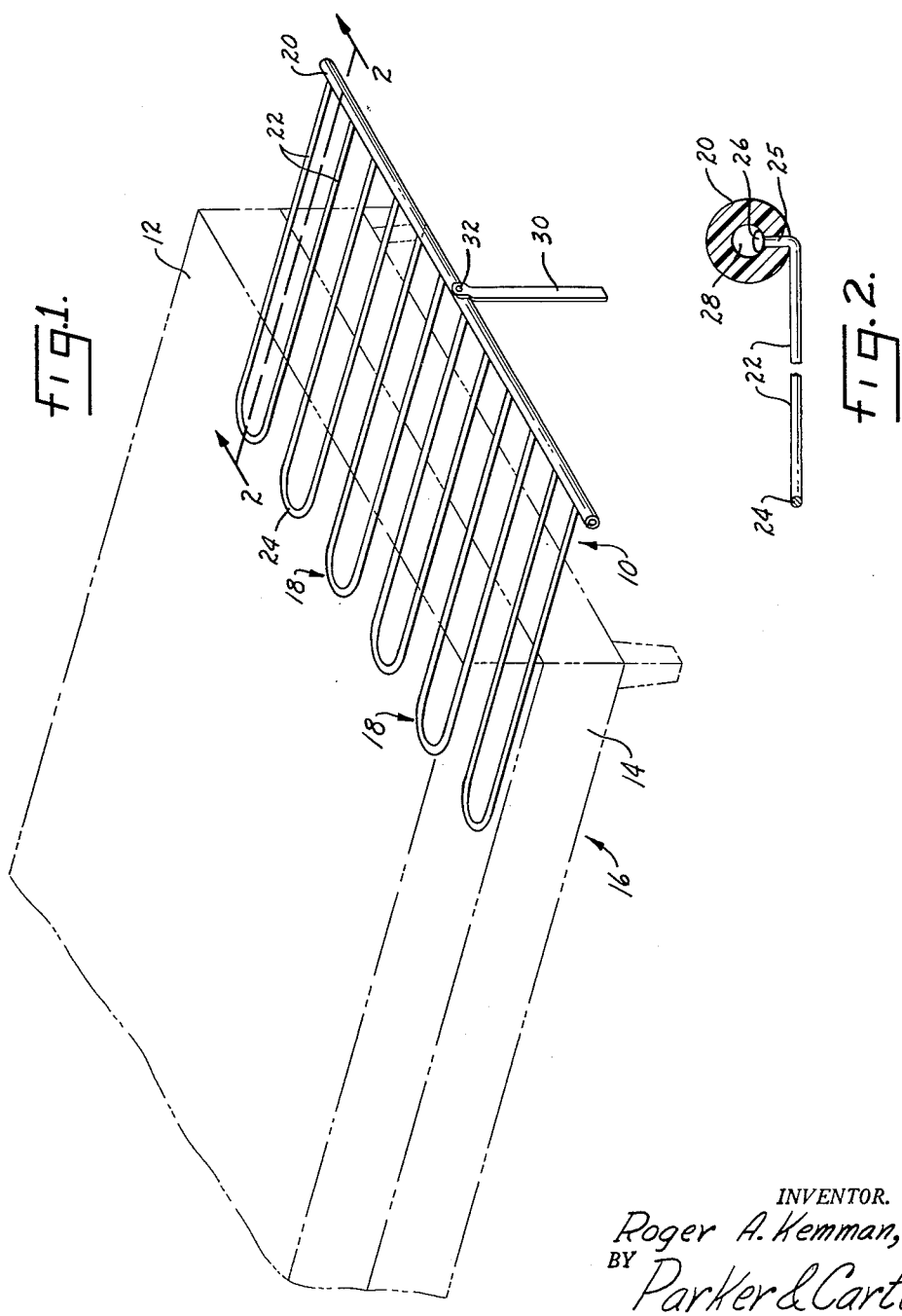

2,979,736
SPREAD HOLDER
Roger A. Kemman, 1818 Edan Court, Beloit, Wis.
Filed Sept. 9, 1958, Ser. No. 759,916
6 Claims. (Cl. 5—320)

This invention is in the field, generally, of furniture and is concerned with what shall be referred to as a spread support or an attachment type support which may be used with the well known Hollywood-type bed or the like.

A primary object of the invention is an attachment to be used with a Hollywood-type bed or the like, that is far less expensive than anything previously known.

Another object is a support for a footless bed which keeps the spread or top cover from being thrown on the floor when the bed is in use.

Another object is an attachment which slides between the mattress and springs, possibly box springs, of a Hollywood-type bed for supporting the spread or luggage, or various other items.

Another object is an attachment for the foot of a footless bed which does not require any complicated and troublesome attaching brackets, screws or the like.

Other objects will appear from time to time in the ensuing specification and drawings in which:

Figure 1 is a perspective of the invention; and
Figure 2 is a section along line 2—2 of Figure 1.

In Figure 1 the supporting attachment has been indicated generally at 10 and is shown disposed between the mattress 12 and box springs 14 of a Hollywood-type bed, designated generally 16, which is only shown in phantom or broken lines.

The attachment or support 10 includes a plurality of fingers 18 which extend between the mattress and springs at their forward end and are connected by a cross bar or lateral brace 20 at their rear ends, explained in detail hereinafter. Each of the fingers 18 is shown as made up of a wire bent generally into a loop or U formation so that it has two generally parallel rectilinear lengths 22 integrally connected at their forward ends by a return bend 24. Preferably, the wires are solid and somewhat evenly spaced, although this is not absolutely necessary.

The cross bar 20, as shown in Figure 2, may be a hollow plastic tube and the ends of each of the wires 22 may be bent upwardly as at 25 to project through suitable holes in the plastic tube. The ends of the wires may be upset so that a small knob 26 or the like is provided, which has a greater diameter than the hole through the plastic tube. During assembly, the upturned portion 25 may be pressed through the hole in the plastic tube and the resilience of the plastic is such that it will give and allow the knob 26 to enter the hollow interior 28 of the tube.

The support may be provided with a leg, such as indicated at 30 in Figure 1, which may be pivoted or otherwise suitably connected to the cross bar 20, as at 32. While one leg has been shown, more than one might be used, if desired.

The use, operation and function of the invention are as follows:

The invention takes on the form of a simple inexpensive frame which is quite thin and may be easily inserted between the mattress and springs of a footless type bed, for example a Hollywood bed. While the term Hollywood has been used herein, it should be understood that the invention may be applied to any footless type bed where a frame of the type shown may be slipped between the mattress and springs or between two mattresses.

The frame is made up of a plurality of individual independent fingers which project forwardly from a cross bar to which they are attached. The forward ends of the fingers are well rounded, which facilitates insertion. The fingers are spaced laterally and are made of rectilinear lengths with integral return bends at the forward end.

The cross bar joins together the rear ends of the fingers to provide an integral composite structure. While a plastic tube with the ends of the wires that make up the fingers embedded in it, as shown in Figure 2, is preferred, nevertheless, the invention is not restricted to plastic and the frame might be all metal, or some wood might be used.

One advantage of the invention is that the forwardly projecting fingers are individually free. Thus, if the frame is fully inserted so that the cross bar 20 is flush against the mattress, a person using the bed will not sense the presence of the frame or in any way be made uncomfortable by it since the individual fingers will give under his weight. This is also true if the invention is used with a double bed since the fingers will move differentially and freely under various weights, regardless of how the weight is distributed. But, at the same time, the fingers are structurally strong and when the frame is partially slid out, such as shown in Figure 1, it may be easily used to support the spread. This avoids the unpleasant task of throwing the spread on the floor.

It is also within the spirit of the invention to use the frame as a support for luggage or various other articles. But when substantial weight is involved, a leg, such as shown at 30 in Figure 1, should probably be used. Such a leg or support may be pivoted to the cross bar so that it may be out of the way when not in use. The leg might be adjustable as to length so that the frame could be made to fit any bed, regardless of its height. The leg 30 might be separately attached to the frame, but it is preferred that it be permanently attached thereto, such as by a pivot or the like, if a leg is used. One or more legs might be used.

The invention could be made in sizes to fit either twin or double beds. For extra large beds, which are the equivalent of two twins pushed together, the supports for two twin beds could be used. Or one large one might be made, but this would probably prove undesirable.

It should be noted that the frame is clean cut and has no projections or loose ends to catch on the bedding. When not in use, it is completely out of sight and will in no way mar the appearance of the bed. The cross bar 20 may be pushed flush against the mattress and the spread will easily cover it when the bed is made up. If the invention is used in a small room, it might be pulled out only a short distance, for example 12 inches. Or it could be pulled out to any distance. The point is that it could be pulled out a suitable distance in accordance with the space available in the room and in this sense accommodates itself to almost any situation.

Plastic has been mentioned but the unit might be all metal or wood might be involved. The loops could be about three feet long so that the support or frame could be pulled out from 12 to 18 inches. The part remaining between the mattress and box springs would be enough to support the weight of the spread on the remainder.

The invention has the additional advantage that, with a heavy spread, it is difficult to fold it up every night in addition to being troublesome. Then the next morning it is again difficult to properly center the spread so that it hangs evenly on the edges of the bed. But with this arrangement, it may be merely rolled back and laid across the projecting end of the frame. The next morning it may be easily pulled up and centering is no problem.

While the preferred form and several variations of the invention have been shown and suggested and described, it should be understood that suitable additional modifications, changes, substitutions and alterations may be made without departing from the invention's fundamental theme. It is, therefore, wished that the invention be unrestricted except as by the appended claims.

I claim:

1. In a spread holder for footless beds, such as Hollywood-type beds and the like, a frame adapted to be inserted and to slide back and forth between the mattress and springs of such a bed, the frame including a plurality of laterally spaced, generally parallel, independent fingers adapted to project forwardly between the mattress and springs, and a cross bar across and joining the rear ends of the fingers adapted to be disposed at the end of the bed when the holder is fully inserted and to be spaced therefrom when the holder is partially withdrawn so that the projected portion may support a spread, each finger being spaced from the adjacent fingers and being otherwise free as to flexibility and being unsupported except by its connection to the cross bar so that the outer end of each finger is free to flex freely in either direction.

2. The structure of claim 1 further characterized in that each finger includes a wire formed into generally parallel rectilinear lengths interconnected by an integral return bend at the forward end.

3. The structure of claim 1 further characterized by and including at least one supporting leg movably attached to the cross bar and adapted to be downwardly disposed therefrom to contact the floor to support the rear end of the frame.

4. The structure of claim 1 further characterized in that each finger includes a wire bent into a forwardly disposed bend with the two ends rearwardly disposed, the cross bar including a hollow plastic tube, the ends of the wire being upset and pressed through spaced holes in the tube.

5. In a holder for use with footless beds and the like for holding spreads, luggage and the like, a frame constructed to be inserted in the foot of such a bed, the frame including a plurality of laterally spaced, lonigtudinally disposed wires adapted to project forwardly in the bed and to be slid back and forth therein, and a lateral bar structure across and interconnecting the rear ends of the wires, the wires being of such a length that the holder may be fully inserted with the bar at the end of the bed and may be partially withdrawn rearwardly to function as an extended support, each wire being spaced from the adjacent wires and being otherwise free as to flexibility and being unsupported except by its connection to the cross bar so that the outer end of each wire is free to flex freely in either direction.

6. In a holder for the foot of footless beds, such as Hollywood-type beds and the like, a frame adapted to be inserted and to slide back and forth under the mattress of such a bed, the frame including a plurality of otherwise independent fingers with well rounded forward ends adapted to project forwardly under the mattress, and a cross bar across and joining the fingers adjacent their rear ends and adapted to be disposed at the foot of the bed when the holder is fully inserted and to be spaced therefrom when the holder is partially withdrawn so that the projecting portion thereof may function as a support, each finger being spaced from the adjacent fingers and being otherwise free as to flexibility and being unsupported except by its connection to the cross bar so that the outer end of each finger is free to flex freely in either direction.

References Cited in the file of this patent

UNITED STATES PATENTS

| | | |
|---|---|---|
| 157,725 | Sherwood et al. | Dec. 15, 1874 |
| 713,529 | Swindell | Nov. 11, 1902 |
| 1,359,430 | Richards | Nov. 16, 1920 |
| 2,071,155 | Alexander | Feb. 16, 1937 |
| 2,319,470 | Nobles | May 18, 1943 |
| 2,562,333 | Ries | July 31, 1951 |
| 2,633,400 | Ring | Mar. 31, 1953 |
| 2,793,887 | Moore | May 28, 1957 |
| 2,844,261 | Chalmers | July 22, 1958 |